US008310112B2

(12) United States Patent
Joos et al.

(10) Patent No.: US 8,310,112 B2
(45) Date of Patent: Nov. 13, 2012

(54) CONTROL UNIT AND METHOD FOR PULSE WIDTH MODULATED CONTROL

(75) Inventors: Uli Joos, Nonnenhorn (DE); Thomas Michael, Lenting (DE); Josef Schnell, Wasserburg (DE); Thomas Rössler, Hofstetten (DE)

(73) Assignee: Conti Temic Microelectronic GmbH (DE)

( * ) Notice: Subject to any disclaimer, the term of this patent is extended or adjusted under 35 U.S.C. 154(b) by 360 days.

(21) Appl. No.: 12/519,923

(22) PCT Filed: Dec. 14, 2007

(86) PCT No.: PCT/DE2007/002272
§ 371 (c)(1),
(2), (4) Date: Feb. 17, 2010

(87) PCT Pub. No.: WO2008/077381
PCT Pub. Date: Jul. 3, 2008

(65) Prior Publication Data
US 2010/0141032 A1    Jun. 10, 2010

(30) Foreign Application Priority Data

Dec. 22, 2006   (DE) .......................... 10 2006 062 267

(51) Int. Cl.
*H01H 9/54* (2006.01)
(52) U.S. Cl. ...................................................... 307/140
(58) Field of Classification Search .................... 307/140
See application file for complete search history.

(56) References Cited

U.S. PATENT DOCUMENTS

| 5,151,851 | A | 9/1992 | Busch et al. |
|---|---|---|---|
| 6,770,983 | B1 | 8/2004 | Cummings et al. |
| 6,771,162 | B1 | 8/2004 | Moss |
| 7,061,213 | B2 | 6/2006 | Yoshida |
| 7,977,817 | B2 * | 7/2011 | Joos et al. .......... 307/41 |
| 2004/0183469 | A1 | 9/2004 | Lin et al. |
| 2006/0170290 | A1 | 8/2006 | Miyagoe |
| 2007/0132316 | A1 | 6/2007 | Joos et al. |

FOREIGN PATENT DOCUMENTS

| CN | 1799182 A | 7/2006 |
|---|---|---|
| DE | 40 06 124 A1 | 9/1991 |
| DE | 44 40 064 A1 | 5/1996 |
| DE | 103 31 194 A1 | 1/2004 |
| EP | 0 462 547 A2 | 12/1991 |
| WO | WO 2005/056342 A1 | 6/2005 |

* cited by examiner

*Primary Examiner* — Robert L. Deberadinis
(74) *Attorney, Agent, or Firm* — RatnerPrestia

(57) ABSTRACT

A control unit for triggering a plurality of electric loads with a plurality of input signals, wherein the electric loads are triggered by pulse width modulated signals, and the input signals are PWM signals. A method is described with which the control unit triggers a plurality of electric loads with a plurality of input signals. The control unit includes controllable switching provisions, wherein these switching provisions connect at least one load respectively with one of at least two different PWM inputs. A method is described for triggering a plurality of electric loads with the aid of the control unit.

12 Claims, 4 Drawing Sheets

CONTROL UNIT AND METHOD FOR PULSE WIDTH MODULATED CONTROL

CROSS REFERENCE TO RELATED APPLICATIONS

This application is the U.S. national phase application of PCT International Application No. PCT/DE2007/002272, filed Dec. 14, 2007, which claims priority to German Patent Application No. DE102006062267.7, filed Dec. 22, 2006, the contents of such applications being incorporated by reference herein.

BACKGROUND OF THE INVENTION

1. Field of the Invention

The present invention relates to a control unit for triggering a plurality of electric loads with a plurality of input signals, wherein the electric loads are triggered by means of pulse-width modulated signals and the input signals are pulse width modulate (PWM) signals. Furthermore, the invention relates to a method with which the control unit according to aspects of the invention triggers a plurality of electric loads with a plurality of input signals.

2. Description of the Related Art

The triggering of electric loads such as lamps, heating coils, step motors is frequently achieved with the aid of the pulse width modulation method (PWM method). Here, the power delivered to the load can be regulated or controlled by the current flowing into the load by means of pulse width modulation.

An essential advantage of PWM triggering is that the power losses in the triggering electronics can be kept at a low level by the switching operation of the PWM method. For this reason, the PWM method is frequently used in motor vehicles for triggering electronic load components such as lamps.

The PWM signals with which the power feed into the load is switched on or off are usually generated in motor vehicle control devices via timer modules which are integrated into the micro-controller, wherein the pulses of all PWM signals are switched on or are set to logical high at the same point in time, and depending on the PWM-signal duty cycle, can be switched off or set to logical low at different points in time.

This leads to a problem which is also a disadvantage of the PWM method, namely that when the pulses are switched on, very high switching peaks can occur with PWM signals. According to the prior art, different methods are represented in order to reduce these switching peaks with different possible embodiments.

Here, the switch-on time points are above all distributed within a cycle period in such a manner that the alternation portion and thus the attenuation are minimal, and at the same time, the fundamental wave of the resulting input current is as high as possible, and therefore the required limit frequency or attenuation is as high as possible. This can result in fixed phase relations due to the assignment of the switch-on time points.

However, if a plurality of regulation tasks is executed at the same time, i.e. if a plurality of electric loads are regulated or controlled by a corresponding number of PWM signals at the same time, the capacity required in the control electronics increases significantly, or the available computing capacity is reduced for each individual input channel.

SUMMARY OF THE INVENTION

An object of the present invention is therefore to provide a control unit of the type described in the introduction and a corresponding method which make it possible with a lower computing capacity and control electronics capacity to simultaneously trigger a plurality of electric loads with the lowest possible number of PWM signals.

A core principle of the invention is to assign to the control unit controllable switching means and to indicate a corresponding method, wherein with the aid of said switching means, each of the loads to be triggered can be connected with one of the several different PWM inputs respectively.

Here, it should be possible to conduct the connection of each individual load with one or more PWM inputs, independently of all other loads. Furthermore, it should also be possible to trigger several loads synchronously with a shared PWM signal.

The control unit with controllable switching means can however preferably but not exclusively be triggered via a digital interface such as SPI bus.

A control unit according to aspects of the invention of this type, or a method according to aspects of the invention of this type, is used in particular but not exclusively for the pulse width modulated triggering of electric lamps, electric motors and heating coils of a motor vehicle.

The invention will now be explained in greater detail below with reference to exemplary embodiments and figures, as well as tables. In the figures, only those components are shown which are essential for the description of the control unit according aspects of to the invention or of the method according to aspects of the invention. In particular, the controllable switching elements according to aspects of the invention are not shown in the figures. The control unit according to aspects of the invention or the electronic circuit arrangement for implementing the method according to aspects of the invention can as a rule by far more complex, depending on the embodiment.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
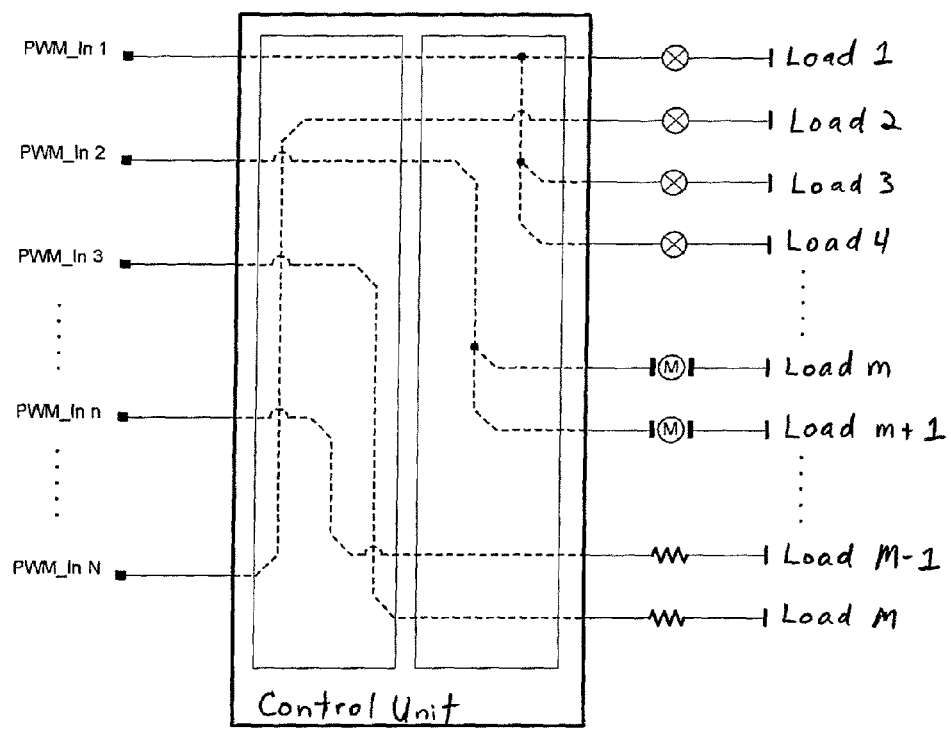
FIGS. 1 to 3 show a schematic view of the control unit according to aspects of the invention for triggering a plurality of loads.
Figure 2:
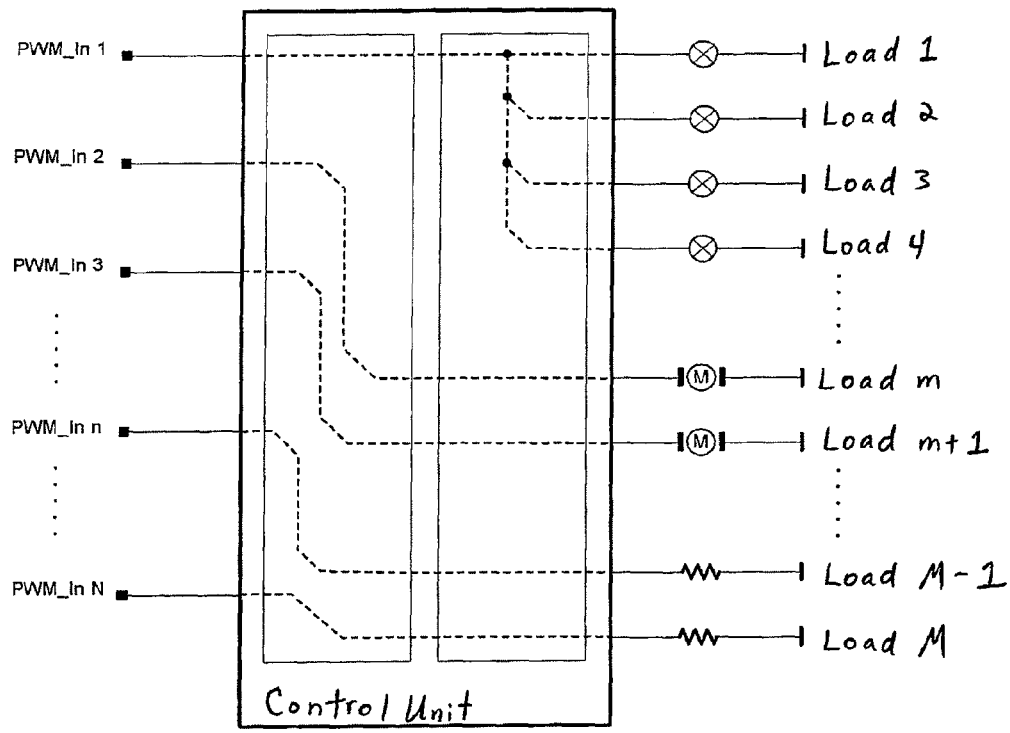
Figure 3:
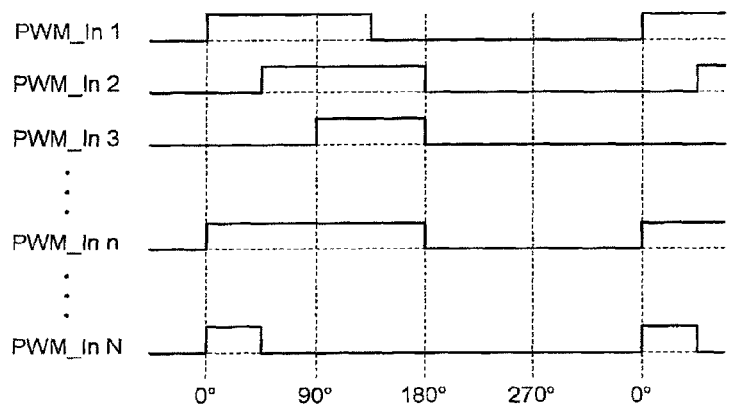

FIGS. 1 to 3 show a schematic view of one of the exemplary embodiments. They show the control unit according to aspects of the invention for triggering a plurality of loads, wherein the loads are also triggered by a plurality of different PWM input signals. "Different PWM input signals" means that the PWM input signals comprise different phasing or duty cycles.

In this exemplary embodiment, for example, M electric loads are triggered by N PWM input signals, wherein advantageously, M>N: M is greater than N. However, M>>N: M is far greater than N is feasible. Here, M and N are any natural number.

Here, each one of the N PWM input signals preferably comprises, as can be seen in FIG. 3 or in table 1, more or less different phasing or duty cycles. In table 1, phasing or duty cycles of all the PWM input signals PWM_In 1, ..., PWM_In N which are shown in FIG. 1 are displayed. Accordingly, the first PWM input signal PWM_In 1 comprises a phasing of 0°, and a duty cycle of 37.5%, and the third PWM input signal PWM_In 3 comprises a phasing of 90° and a duty cycle of 25%.

These different PWM input signals are then switched on, assigned to the respective load with the aid of the control unit according to aspects of the invention. Here, these signals are preferably selected as per requirements with the aid of controllable switching means which are integrated into the control unit, and assigned to the respective load, also with the aid of these controllable switching means. Here, a PWM signal can be assigned to several loads.

As is shown in FIG. 1, the first PWM input is connected at an operating time point t1 to the loads Load 1, Load 3 and Load 4, for example. In this manner, the loads Load 1, Load 3 and Load 4 are synchronously triggered by a shared PWM signal PWM_In 1, while the PWM signal PWM_In 2 synchronously triggers from the second input the loads Load m and Load m+1.

At another operating time point t2, the PWM input or PWM signal PWM_In 1 also triggers Load 2 alongside the loads Load 1, Load 3 and Load 4. The PWM input or PWM signal PWM_In N, which at the operating time point t1 has triggered Load 2, now controls Load M.

The connection of PWM inputs with the loads to be triggered is conducted according to aspects of the invention by the controllable switching elements which are integrated in the control unit, for example with the aid of the multiplex/demultiplex method.

The PWM input signals can for example be generated and regulated by a separate PWM signal generator which is designed independently, and which is opposite the control unit according to aspects of the invention, but can also be generated and regulated by a PWM signal generator unit which is integrated in the control unit according to aspects of the invention.

The triggering of these controllable switching means according to aspects of the invention can be achieved by means of a digital interface, such as and SPI bus.

Figure 4:
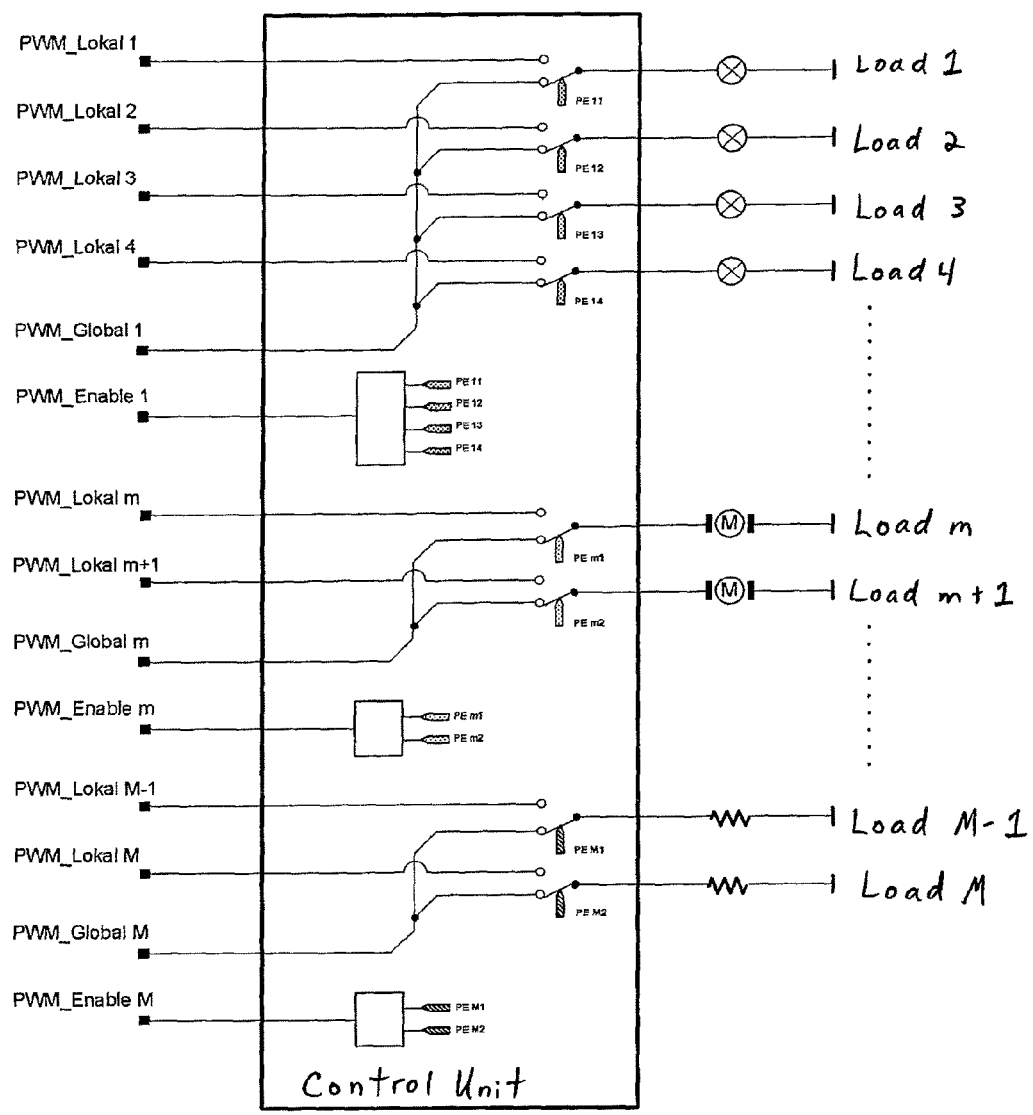
FIGS. 4 to 6 show a further exemplary embodiment including a control unit and a corresponding method, with the aid of which a plurality of loads is triggered both individual by a PWM input which is individually attuned to each individual load, and by a shared PWM input, while retaining the respective phasing.
Figure 5:
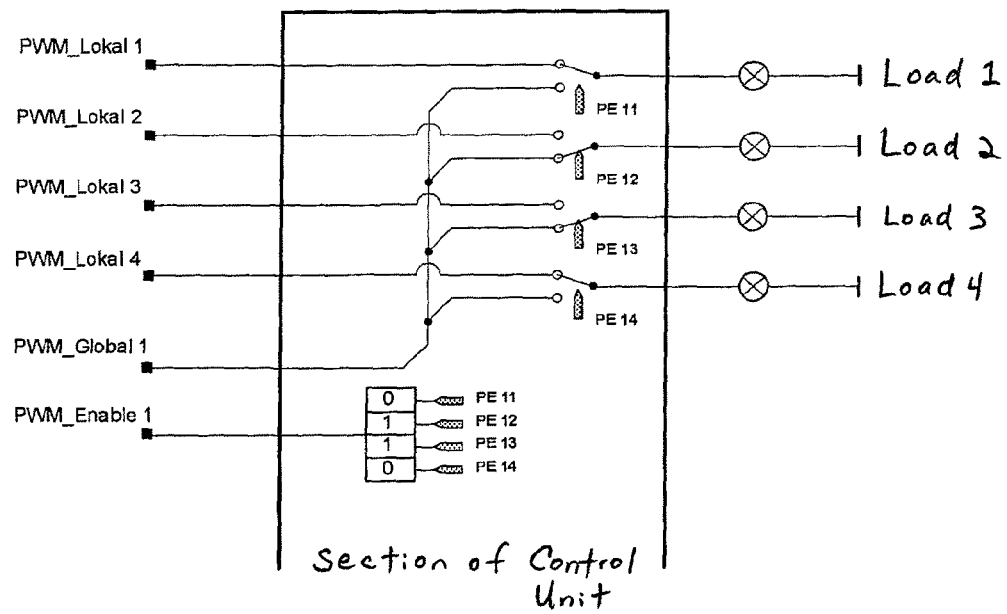
Figure 6:
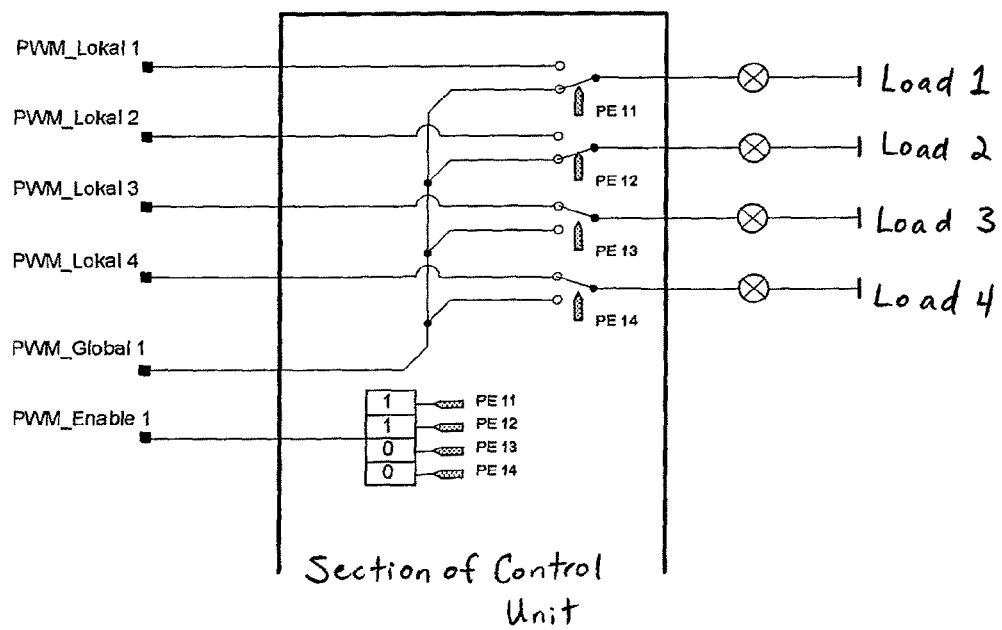

FIGS. 4 to 6 show a further exemplary embodiment, wherein in FIGS. 5 and 6, only a section of FIG. 4 is shown in order to describe the exemplary embodiment according to aspects of the invention. This exemplary embodiment describes a control unit and a corresponding method, with the aid of which a plurality of loads is triggered both individual by a PWM input which is individually attuned to each individual load, and by a shared PWM input, while retaining the respective phasing.

In this exemplary embodiment, each load is preferably provided with an individual PWM input. Furthermore, for loads which are triggered during operation and according to requirements both with different phasing or different duty cycle and with the same phasing or same duty cycle, a shared PWM input is provided.

As FIG. 4 shows, each load is assigned in a switchable manner an individual PWM input, referred to below as the local PWM input. Alongside the local PWM input, each load can also be connected with a second, load-specific, shared PWM input. This load-specific PWM input which is connectable in a shared manner to a plurality of loads is referred to below as the global PWM input. The word "load specific" here means that the loads which are synchronously triggered by a shared PWM input have shared physical, functional properties such as lamps of motor vehicle indicator lights on the right-hand side.

For each load, a controllable switching element is arranged in the control unit according to aspects of the invention. Each switching element switches the load to and fro between the local and global PWM input, as required.

In this manner, each load can be triggered either by the local or the global PWM input. The switchover between the local and the global input is achieved by a switchover signal PWM_Enable which is provided for each global input.

Each PWM_Enable signal for each global PWM input signal has a number of bits, and the maximum number of loads which are to be triggered simultaneously by the respective global input.

As can be seen in FIG. 4, the global PWM input PWM_Global 1 controls a maximum of four loads Load 1 to Load 4 at the same time. Each of these four loads should be connected or disconnected independently of the other 3 loads with or from the global PWM input PWM_Global 1.

This is made possible by the switchover signal PWM_Enable, in this case a 4-bit signal PWM_Enable 1. The switchover signal PWM_Enable 1 sets the global PWM input PWM_Global 1 to the respective load.

As is shown in FIG. 5, the switchover signal PWM_Enable 1 is set in the operating time point t1 by a binary signal value 0110, for example. The global PWM input PWM_Global 1 is thus connected to the loads Load 2 and Load 3. The loads Load 1 and Load 4 are triggered by the respective local PWM input PWM_local 1 or PWM_local 4.

At an operating time point t2, for example, as is shown in FIG. 6, the switchover signal PWM_Enable 1 is set by a binary signal value 1100. The global PWM input PWM_Global 1 is thus connected to the loads Load 1 and Load 2. The loads Load 3 and Load 4 are then connected to the local PWM input PWM_local 3 or PWM_local 4.

Due to the introduction of one or more global PWM inputs, a plurality of loads which for operating purposes must or can be triggered by PWM signals with the same phasing or the same duty cycle, such as the motor vehicle full beam lights, can be triggered by one single global PWM input. As a result, the number of active PWM signals can be reduced, and thus also the EMC radiation (EMC: electromagnetic compatibility) due to the superfluous PWM signals.

A further embodiment of the invention is to combine the two exemplary embodiments described above. As a result, a more flexible triggering of a plurality of electric loads can be achieved at a relatively low capacity requirement and with lower EMC disturbance. The exemplary embodiments explained above clarify the advantage of the control unit according to aspects of the invention, or of the method of pulse-width modulated triggering of loads according to aspects of the invention, so that these loads can be flexibly triggered by a shared PWM input in a synchronous and phase-optimized manner.

Furthermore, due to the triggering of a plurality of loads with one single PWM signal, the number of active PWM signals is reduced, and thus also the required computing capacity.

Due to an arrangement according to the method described above, the greatest possible flexibility of the outputs, with minimum controlling capacity requirement and optimum PWM distribution is achieved at the same time.

The following table 2 shows as an example a bit diagram of the programming of the exemplary embodiment according to FIGS. 4 to 6.

Registers 1 to 4: CH1 control to CH4 control aid the individual programming of four local PWM inputs PWM_local 1 to PWM_local 4 according to PWM duty cycles and phasing, wherein for example 8 bits: D0 to D7 are provided for the setting of PWM duty cycles, and 2 bits: D8 to D9 are provided for the setting of the phasing.

With register 5: global PWM enable, the control unit can switch the loads Load 1 to Load 4 to and fro between the local inputs: PWM_local 1 to 4 and the global input: PWM_Global 1. Register 5: global PWM enable has 4 bits, wherein each bit is assigned to one load respectively.

Register 6 preferably aids the setting of the PWM value of the global input, namely the PWM duty cycle and the phasing of PWM_Global. The phase length when connecting the global input is preferably adopted directly by local inputs, rendering it unnecessary to quit the multi-phase operation.

This method is helpful when regulating light sources from a variable direct current source (e.g. filament lamps or LEDs with multipliers in motor vehicle internal power systems). Here, the number of programming stages, and thus the burden on the control unit, is reduced significantly.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A control unit for controlling a plurality of electric loads, wherein the loads are triggered by pulse width modulated signals, and
wherein the control unit comprises a plurality of pulse width modulated (PWM) inputs, each with a PWM signal,
wherein controllable switching means are provided, wherein with the aid of the switching means, at least one load can be connected respectively with one of at least two different PWM inputs.

2. A control unit according to claim 1, wherein for at least one group of loads, an individual PWM input is provided and a global PWM input is provided, wherein due to the switching means, each load of the group of loads is connected either with a respective individual PWM input or with the global PWM input.

3. A control unit according to claim 1, wherein at least two loads can be synchronously triggered by a PWM input.

4. A control unit according to claim 1, wherein the connection with one of at least two PWM inputs can be separately conducted for each load, independently of all other loads.

5. The triggering of electric loads with a control unit according to claim 1.

6. Motor vehicles with a control unit according to claim 1.

7. A method for triggering a plurality of electric loads comprising the steps of:
triggering electric loads by pulse width modulated signals, and
triggering electric loads with a plurality of PWM inputs with one PWM signal respectively,
wherein at least one load is connected respectively with one of at least two different PWM inputs.

8. A method according to claim 7, wherein at least two loads are synchronously triggered by a PWM input.

9. A method according to claim 7, wherein at least two loads are triggered synchronously by a PWM input with different phasing.

10. A method according to claim 7, wherein the connection with one of at least two PWM inputs is conducted separately for each load independently of all other loads.

11. The triggering of electric loads with a control unit according to the method of claim 7.

12. Motor vehicles having a control unit using the method of claim 7.

* * * * *